(12) United States Patent
Ironside et al.

(10) Patent No.: US 10,399,904 B2
(45) Date of Patent: Sep. 3, 2019

(54) GYPSUM PRODUCT COMPOSITION, GYPSUM PRODUCTS, AND A METHOD FOR USING A COMPOUND IN GYPSUM BOARD

(71) Applicants: Kane Ironside, Shanghai (CN); Hao Song, Shanghai (CN)

(72) Inventors: Kane Ironside, Shanghai (CN); Hao Song, Shanghai (CN)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 16/062,532

(22) PCT Filed: Dec. 18, 2015

(86) PCT No.: PCT/CN2015/097886
§ 371 (c)(1),
(2) Date: Jun. 14, 2018

(87) PCT Pub. No.: WO2017/101110
PCT Pub. Date: Jun. 22, 2017

(65) Prior Publication Data
US 2018/0370855 A1     Dec. 27, 2018

(51) Int. Cl.
| | | |
|---|---|---|
| B32B 13/08 | (2006.01) | |
| C04B 28/14 | (2006.01) | |
| C04B 22/06 | (2006.01) | |
| C04B 22/08 | (2006.01) | |
| C04B 22/10 | (2006.01) | |
| C04B 22/16 | (2006.01) | |
| C04B 14/18 | (2006.01) | |
| C04B 111/00 | (2006.01) | |

(52) U.S. Cl.
CPC .............. *C04B 28/14* (2013.01); *B32B 13/08* (2013.01); *C04B 14/18* (2013.01); *C04B 22/06* (2013.01); *C04B 22/085* (2013.01); *C04B 22/10* (2013.01); *C04B 22/16* (2013.01); *B32B 2607/00* (2013.01); *C04B 2111/0062* (2013.01)

(58) Field of Classification Search
CPC ......... C04B 28/14; C04B 14/18; C04B 22/06; C04B 22/085; C04B 22/10; C04B 22/16; C04B 2111/0062; B32B 11/08; B32B 2607/00
USPC ....................................................... 428/537.7
See application file for complete search history.

(56) References Cited

U.S. PATENT DOCUMENTS

2003/0084980 A1 * 5/2003 Seufert ................ C04B 24/383
156/39
2010/0203317 A1   8/2010 Sahay

FOREIGN PATENT DOCUMENTS

| AU | 2013101008 A4 | | 7/2013 |
| AU | 2013101008 A4 | * | 8/2013 |
| AU | 2014100494 B4 | | 5/2014 |
| AU | 2014100494 B4 | * | 2/2015 |
| CN | 101121587 A | | 2/2008 |
| CN | 1011215587 | * | 2/2008 |

OTHER PUBLICATIONS

International Search Report and Written Opinion dated Sep. 13, 2016 for International Application No. PCT/CN2015/097886, filed Dec. 18, 2015.
Extended European Search Report dated Jun. 27, 2019 in European Patent Application 15910580.8.

\* cited by examiner

*Primary Examiner* — Leszek B Kiliman
(74) *Attorney, Agent, or Firm* — Dorsey & Whitney LLP (57) ABSTRACT

A gypsum board composition was disclosed which comprises stucco, adhesive, water and additive for improving bonding, wherein the additive for improving bonding is shown in chemical formula as $M^{I}M^{II}(OH)_2(A^{n-}) \cdot mH_2O$, wherein $M^{I}$ is a divalent metal ion, $M^{II}$ is a trivalent metal ion, and $A^{n-}$ is an interlayer anion, and wherein $M^{I}$ and $M^{II}$ are different metals. Also, a gypsum board made with the composition of the above and a method for using a compound shown in the aforesaid chemical formula were disclosed.

33 Claims, 6 Drawing Sheets

GYPSUM PRODUCT COMPOSITION, GYPSUM PRODUCTS, AND A METHOD FOR USING A COMPOUND IN GYPSUM BOARD

CROSS-REFERENCE TO RELATED APPLICATIONS

This application is the national phase of International Application No. PCT/CN2015/097886, filed on Dec. 18, 2015, and entitled "GYPSUM PRODUCT COMPOSITION, GYPSUM PRODUCTS, AND A METHOD FOR USING A COMPOUND IN GYPSUM BOARD."

TECHNICAL FIELD

The present invention relates to a gypsum product, in particular to a gypsum board composition, a gypsum board and the use of a compound as an additive for improving bonding in a gypsum board.

BACKGROUND

In the field of modern architecture, gypsum is a major material used in the construction industry. It is well-known that gypsum boards comprise a gypsum plate formed using powders of minerals, adhesive and other compositions, and lining papers being wrapped on each major surface of the gypsum plate.

Generally, the starch is used as the adhesive in gypsum board. As is well known in the art, the bonding strength between the gypsum plate and the lining papers is positively related to the starch content. That is, in general, higher starch content gives a higher bonding strength between the gypsum plate and the lining paper. However, there is a limitation for the content of the starch that could positively contribute to the bonding of the gypsum. This means that the bonding strength is not improved by adding more starch above a threshold, where the threshold may depend on the application environment.

Meanwhile, the Cl⁻ present in gypsum material, water and additives negatively impacts the bonding of a gypsum board, leading to poor bonding between the paper and the gypsum plate in the final product. This problem typically occurs when the content of Cl⁻ exceeds 300 ppm. Traditionally, using more starch during production of a gypsum board would mitigate the impact of Cl⁻. However, as mentioned above, there is a limit to the effectiveness of starch at higher addition levels.

Also, in other gypsum product, such as plaster and joint compound, the Cl⁻ present would lead to efflorescence of the gypsum product.

In this regard, there always is a need in the art to improve the bonding strength between the gypsum plate and lining paper in a gypsum board without using more starch therein and at least mitigate the negative impact of Cl⁻.

SUMMARY

The present invention is directed to a gypsum board composition, comprising stucco, adhesive, water and an additive for improving bonding, wherein the additive is shown in the following formula, $$M^I M^{II}(OH)_2(A^{n-}) \cdot m H_2 O \tag{1}$$

wherein, $M^I$ is a divalent metal ion, and preferably is selected from a group consisting of $Mg^{2+}$, $Ni^{2+}$, $Fe^{2+}$, $Ca^{2+}$, $Zn^{2+}$, $Cu^{2+}$, and $Mn^{2+}$, and more preferably is $Mg^{2+}$. Wherein, $M^{II}$ is a trivalent metal ion, and preferably is selected from a group consisting of $Fe^{3+}$, $Al^{3+}$, $Ni^{3+}$, and, and more preferably is $Al^{3+}$. Wherein, $M^I$ and $M^{II}$ are different metals. Wherein, $A^{n-}$ is an interlayer anion, and preferably is selected from a group consisting of $CO_3^{2-}$, $OH^-$, $NO_3^-$, $PO_3^{4-}$, and $SO_4^{2-}$, and preferably is $CO_3^{2-}$. Wherein m is an integer. In one example, $M^I$ is $Mg^{2+}$, $M^{II}$ s $Al^{3+}$, and $A^{n-}$ is $CO_3^{2-}$.

Further, the content of the additive is greater than 0 wt. %, and less than or equal to 5 wt. %. Wherein, in the present invention, the term "wt. %" means the percentage with regard to stucco in weight.

Further, the adhesive could be starch and/or Polyvinyl Alcohol (PVA). The content of the adhesive could be greater than 0.06 wt. % of the stucco, and preferably ranges from 0.3 wt. % to 1.0 wt. %, and more preferably from 0.3 wt. % to 0.5 wt. %, and most preferably is 0.3 wt. %.

Further, the composition could comprise an accelerator to achieve a target initial set time, based on the application environment.

In another aspect of the present invention, a gypsum board comprises a main gypsum plate comprising stucco, adhesive and additive therein, and lining papers on both major surfaces of the plate. The additive is shown in the following formula:

$$M^I M^{II}(OH)_2(A^{n-}) \cdot m H_2 O \tag{1},$$

wherein, $M^I$ is a divalent metal ion, and preferably is selected from a group consisting of $Mg^{2+}$, $Ni^{2+}$, $Fe^{2+}$, $Ca^{2+}$, $Zn^{2+}$, $Cu^{2+}$, and $Mn^{2+}$. Wherein, $M^{II}$ is a trivalent metal ion, and preferably is selected from a group consisting of $Fe^{3+}$, $Al^{3+}$, $Ni^{3+}$, and $Co^{3+}$. Wherein, $M^I$ and $M^{II}$ are different metals. Wherein, the $A^{n-}$ is an interlayer anion and comprises at least Cl⁻. Further, the $A^{n-}$ also comprises an anion selected from a group consisting of $CO_3^{2-}$, $OH^-$, $NO_3^-$, $PO_3^{4-}$, and $SO_4^{2-}$, and preferably is $CO_3^{2-}$. Wherein m is an integer. In one example, the $M^I$ is $Mg^{2+}$, and the $M^{II}$ is $Al^{3+}$.

Wherein, the content of the additive is greater than 0 wt. % and less than or equal to 5 wt. % of the stucco. Wherein, in the present invention, the term "wt. %" means the percentage of stucco in weight.

Further, the adhesive could be starch and/or Polyvinyl Alcohol. Meanwhile, the content of the adhesive is greater than 0.06 wt. % of the stucco.

In another aspect of the present invention, a method for using a compound as shown in the following formula, and furthermore, the compound is used as an additive for improving the bonding of a gypsum board.

$$M^I M^{II}(OH)_2(A^{n-}) \cdot m H_2 O \tag{1}$$

wherein, the $M^I$ is a divalent metal ion, and preferably is selected from a group consisting of $Mg^{2+}$, $Ni^{2+}$, $Fe^{2+}$, $Ca^{2+}$, $Zn^{2+}$, $Cu^{2+}$, and $Mn^{2+}$, and more preferably is $Mg^{2+}$. Wherein, the $M^{II}$ is a trivalent metal ion, and preferably is selected from a group consisting of $Fe^{3+}$, $Al^{3+}$, $Ni^{3+}$, and $Co^{3+}$, and more preferably is $Al^{3+}$. Wherein, $M^I$ and $M^{II}$ are different metals. Wherein, the $A^{n-}$ is an interlayer anion and is selected from a group consisting of $CO_3^{2-}$, $OH^-$, $NO_3^-$, $PO_3^{4-}$, and $SO_4^{2-}$. Wherein m is an integer. In one example, the $M^I$ is $Mg^{2+}$, the $M^{II}$ is $Al^{3+}$, and the $A^{n-}$ is $CO_3^{2-}$.

Wherein, the content of the additive is greater than 0 wt. %, and less than or equal to 5 wt. % of the stucco.

Further, the gypsum board comprises stucco and adhesive, wherein, the adhesive could be starch and/or Polyvinyl Alcohol. The content of the adhesive is greater than 0.06 wt. %. In one example, the content of the starch is 0.3 wt. %.

In another aspect of the present invention, a gypsum plaster composition, comprising stucco, water, sand and an additive of the following chemical formula, $$M^{I}M^{II}(OH)_2(A^{n-}) \cdot mH_2O, \quad (1),$$

wherein the $M^I$ is a divalent metal ion, the $M^{II}$ is a trivalent metal ion, $A^{n-}$ is an interlayer anion, and $M^I$ and $M^{II}$ are different metals. Wherein, $M^I$ is selected from a group consisting of $Mg^{2+}$, $Ni^{2+}$, $Fe^{2+}$, $Ca^{2+}$, $Zn^{2+}$, $Cu^{2+}$, and $Mn^{2+}$. Wherein, $M^{II}$ is selected from a group consisting of $Fe^{3+}$, $Al^{3+}$, $Ni^{3+}$, and $Co^{3+}$. Wherein $A^{n-}$ is selected from a group consisting of $CO_3^{2-}$, $OH^-$, $NO_3^-$, $PO_4^{3-}$, and $SO_4^{2-}$. Wherein m is an integer. In one example, $M^I$ is $Mg^{2+}$, the $M^{II}$ is $Al^{3+}$, and the $A^{n-}$ is $CO_3^{2-}$.

Wherein, the composition further comprises perlite. Wherein, the perlite is present in an amount of 1-10% relative to the weight of the gypsum particles.

The advantage of applying the additive of the above in a gypsum plaster would be reducing efflorescence.

In another aspect of the present invention, a gypsum-based jointing compound composition, wherein, comprises stucco, water, polymer additives and an additive of the following chemical formula, $$M^{I}M^{II}(OH)_2(A^{n-}) \cdot mH_2O, \quad (1),$$

wherein the $M^I$ is a divalent metal ion, the $M^{II}$ is a trivalent metal ion, $A^{n-}$ is an interlayer anion, and $M^I$ and $M^{II}$ are different metals. Wherein is selected from a group consisting of $Mg^{2+}$, $Ni^{2+}$, $Fe^{2+}$, $Ca^{2+}$, $Zn^{2+}$, $Cu^{2+}$, and $Mn^{2+}$. Wherein $M^{II}$ is selected from a group consisting of $Fe^{3+}$, $Al^{3+}$, $Ni^{3+}$, and $Co^{3+}$. Wherein $A^{n-}$ is selected from a group consisting of $CO_3^{2-}$, $OH^-$, $NO_3^-$, $PO_4^{3-}$, and $SO_4^{2-}$. Wherein m is an integer. In one example, the $M^I$ is $Mg^{2+}$, the $M^{II}$ is $Al^{3+}$, and the $A^{n-}$ is $CO_3^{2-}$.

The advantage of applying the additive of the above in a gypsum-based jointing compound would be reducing efflorescence.

BRIEF DESCRIPTION OF THE DRAWINGS

The present invention will be described in details with reference to the figures, in which.

DETAILED DESCRIPTION

More specific details are described in the following description in order to fully understand the present invention. However, the present invention can also be implemented by means other than those described here. Thus, the present invention should not be construed as limited only to the following specific embodiments.

As discussed in the background art, gypsum has advantages of light weight and high structural strength, and has been widely used in the construction industry. However, it has been discovered in practice that, a disadvantage of gypsum boards is that the bonding strength between the gypsum plate and the lining paper is determined by the starch content used. Also, as is known, the bonding strength between the gypsum plate and the lining paper is not increased by adding starch above a threshold amount, where the threshold depends on the application environment. In this regard, the bonding of the gypsum board may be not sufficient in some cases.

To solve the defect of weak bonding in some case, the present invention provides a composition and a gypsum product made of the composition. The gypsum product made of the composition of the invention has significantly improved bonding ability, compared with prior art.

The composition of the present invention comprises stucco, adhesive, water, and an additive as follows, $$M^{I}M^{II}(OH)_2(A^{n-}) \cdot mH_2O \quad (1),$$

wherein, $M^I$ is a divalent metal ion, and is selected from the group consist of $Mg^{2+}$, $Ni^{2+}$, $Fe^{2+}$, $Ca^{2+}$, $Zn^{2+}$, $Cu^{2+}$ and $Mn^{2+}$, and preferably is $Mg^{2+}$.

Wherein, $M^{II}$ is a trivalent metal ion, and is selected from a group consisting of $Fe^{3+}$, $Al^{3+}$, $Ni^{3+}$, and $Co^{3+}$, and preferably is $Al^{3+}$. Wherein, $M^I$ and $M^{II}$ are different metals.

Wherein, $A^{n-}$ is an interlayer anion, and is selected from a group of $CO_3^{2-}$, $OH^-$, $NO_3^-$, $PO_4^{3-}$, and $SO_4^{2-}$, and preferably is $CO_3^{2-}$.

Wherein m is an integer.

Wherein, the content of the additive is less than or equal to 5 wt. %, and greater than 0 wt. % of the stucco.

Wherein, the adhesive could be starch and/or Polyvinyl Alcohol. The content of the adhesive is greater than 0.06 wt. % of the stucco, and preferably ranges from 0.3 wt. % to 1.0 wt. %, and more preferably from 0.3 wt. % to 0.5 wt. %, and most preferably is 0.3 wt. %.

The present invention could improve the bonding strength within a final product, i.e., a gypsum board. In the context of this specification, the so called "cross-cut test" is applied to individual examples of the invention in order to demonstrate how one skilled in the art would assess the advantage of the present invention.

Figure 1:
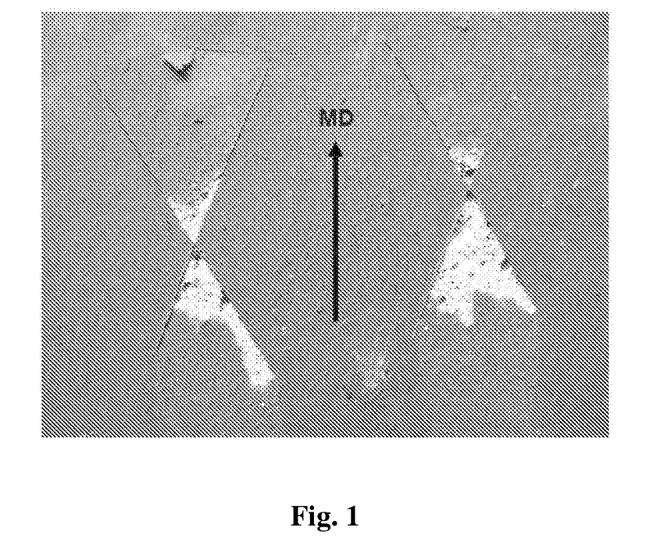
FIG. 1 shows a cross-cut test board.

The cross-cut test is the most common test used to assess the bond strength between a gypsum plate and the lining paper in a gypsum board. A craft knife with a sharp blade is required. Across-cut similar to that shown in FIG. 1 (MD denotes the direction of manufacture), and the area of the liner which remains bonded to the gypsum plate is measured as a percentage of the total area of the cross-cut.

In the following description, various examples of the invention are described in detail. In order to demonstrate the effect of the present invention, contact tests comparing samples of the present invention to a reference object are presented in the following parts of this specification. The samples of present invention could be gypsum boards made of the composition as described above. Similarly, the reference object means a gypsum board that is made of a composition without the additive as shown in formula (1).

In the context of this specification, the difference between the gypsum boards of the examples and the reference object are that the composition recipes of the examples are different and the recipe of the reference object does not comprise the additive. Apart from these differences, the gypsum board of the examples and the reference object could be made by the same following steps:

I. Mix stucco, additive, adhesive, and also accelerator to achieve a target initial set time for the convenience of lab operation. Then mix in water and blend the mixture to produce slurry.
II. Pour the obtained slurry into the defined mold (the mold is placed on the lining paper). Then put another lining paper onto the upper surface of the slurry in the mold, press the upper lining paper to make redundant slurry overflow, so that the slurry between two lining papers is solidified to produce a gypsum plate with two lining papers on either major surface of the gypsum plate.
III. After setting the gypsum plate is taken out of the mold and put into a 180° C. oven for sufficient time to remove the excess water (this oven should have high humidity inside). After that, put the gypsum plate into another oven at 60° C. until fully dried.
IV. On both major surfaces of the gypsum plate, a series of cross cuts (similar to those shown in FIG. 1) are done at two different instances: the $1^{st}$ instance is just after 60° C. drying; the $2^{nd}$ instance is after conditioning at 20±0.5° C. and 90±2% RH).

Wherein, the stucco could be hemihydrate of desulfurated gypsum. The adhesive can be starch and/or Polyvinyl Alcohol. Further, the starch could be corn starch, and Polyvinyl Alcohol could be PVA model 2488.

Furthermore, as shown in step I, an accelerator could be used in production of a gypsum board to achieve a target initial set time, based on the application environment. The accelerator could be any that one skilled in the art could be obtained in commercial ways. For example, Heat Resistant Accelerator is a common accelerator which is used in the above gypsum board production.

Meanwhile, in the following examples, the level of Cl⁻ in the composition is 700 ppm if not specified. Further, $CaCl_2 \cdot 2H_2O$ is be added to the composition in order to adjust the content level of Cl⁻ to 700 ppm or other level, so that the results of each sample are comparable.

Details of the present invention would be described in context of the following examples.

Example 1

In this example, a gypsum board composition comprises stucco, starch, water and additive according to formula (1), wherein, $M^I$ is $Mg^{2+}$, $M^{II}$ is $Al^{3+}$, $A^{n-}$ is $CO_3^{2-}$, and m is 4. That is, the additive is as shown in the following formula:

$$MgAl(OH)_2(CO_3) \cdot 4H_2O \qquad (2).$$

In this example, the gypsum board contains the additive in an amount of 1 wt. % of the stucco, and starch is in an amount of 0.3 wt. %.

The gypsum board of this example is made with steps I-IV, as described above, and a recipe of 700 g stucco, 630 g water, 7 g additive, 2.1 g starch. In addition, 0.7 g accelerator is present in the recipe, in order to keep the set time constant. A certain amount of $CaCl_2 \cdot 2H_2O$ is also present in the recipe, in order to adjust the content level of Cl⁻ to 700 ppm.

Meanwhile, the reference object is made with similar steps by using a recipe of 700 g stucco, 630 g water, 2.1 g starch, 0.7 g accelerator, and certain amount of $CaCl_2 \cdot 2H_2O$.

The cross-cut test is applied to a sample of a gypsum board made by using the composition of this example, and is also applied to a reference object.

Figure 2:
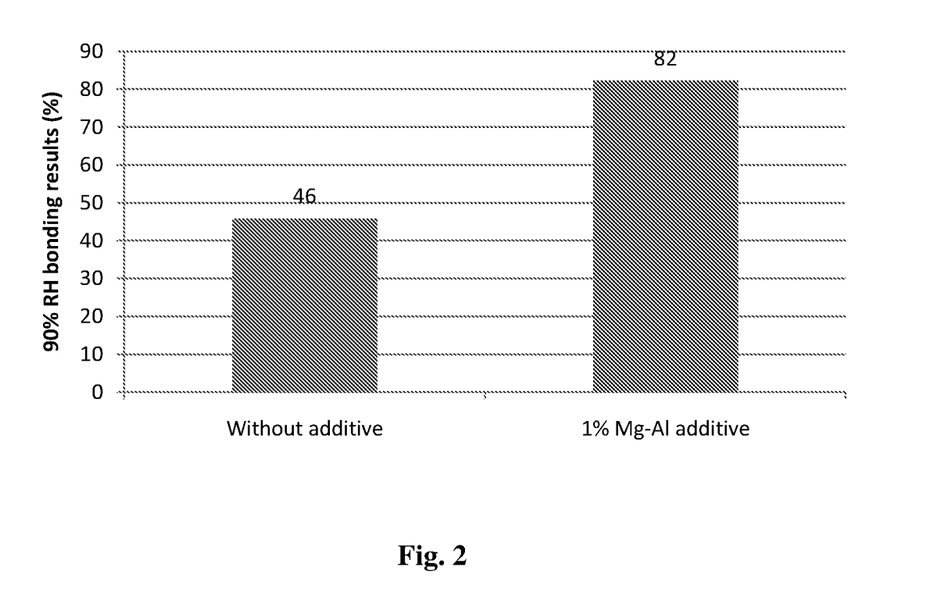
FIG. 2 shows the result of cross-cut test on samples of Example 1.

FIG. 2 shows the cross-cut test result of example 1, and also shows the cross-test result of a reference object, i.e., a final product without the additive of formula (1).

With reference to the following table 1 and FIG. 2, it is easy to conclude that the additive improves the bonding of a final product of gypsum board.

TABLE 1

|  | Additive (Wt. %) | Adhesive (wt. %) | 90% RH Bonding test result (%) |
| --- | --- | --- | --- |
| Sample 1 | 1 | 0.3 | 82 |
| Reference object 1 | 0 | 0.3 | 46 |

Example 2

In this example, a gypsum board composition comprises stucco, starch, water and additive according to formula (1), with a different selection for $M^I$, $M^{II}$, $A^{n-}$, and m. The additive is as shown in the following formula:

$$ZnAl(OH)_2(CO_3) \cdot 2H_2O \qquad (3).$$

That is, $M^I$ is $Zn^{2+}$, $M^{II}$ is $Al^{3+}$, $A^{n-}$ is $CO_3^{2-}$, and m is 2.

The gypsum board of this example contains the additive in an amount of 1 wt. % of the stucco, and the content of the starch is 0.3 wt. %.

A cross-cut test was applied to a gypsum board that is made with the steps described as above by using a composition this example with a recipe of 700 g stucco, 630 g water, 7 g additive, 2.1 g starch, 0.7 g accelerator, and a certain amount of $CaCl_2 \cdot 2H_2O$ that is used to adjust the concentration of Cl⁻ to a comparable level for each samples. Meanwhile, a reference object is made with similar steps by using a recipe of same amount of stucco, water, starch, $CaCl_2 \cdot 2H_2O$ and accelerator. The cross-cut test was also applied to the reference object.

Figure 3:
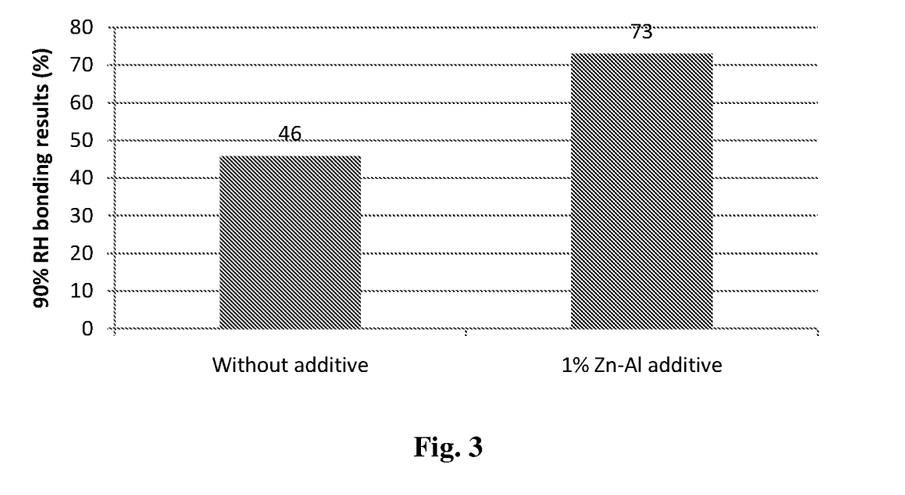
FIG. 3 shows the result of cross-cut test on samples of Example 2.

FIG. 3 and Table 2 show the cross-test result of example 2 and a reference object.

TABLE 2

|  | Additive (Wt. %) | Adhesive (wt. %) | 90% RH Bonding test result (%) |
| --- | --- | --- | --- |
| Sample 2 | 1 | 0.3 | 73 |
| Reference object 2 | 0 | 0.3 | 46 |

With reference to Table 2 and FIG. 3, it is obvious that the additive improves the bonding of a final product of gypsum board.

Example 3

In this example, a gypsum board composition comprises stucco, starch, water and additive according to formula (1), wherein $M^I$ is $Cu^{2+}$, $M^{II}$ is $Al^{3+}$, the $A^{n-}$ is $CO_3^{2-}$ and m is 2, as shown in the following formula:

$$CuAl(OH)_2(Co_3) \cdot 2H_2O \qquad (4),$$

wherein, the gypsum board contains 1 wt. % of the additive, and starch of 0.3 wt. % of the stucco.

A cross-cut test was applied to a gypsum board made according to this example. The gypsum board of this example was made with the steps described as above and by using a composition with a recipe of 700 g stucco, 630 g water, 7 g additive, 2.1 g starch, 0.7 g accelerator, and certain amount of $CaCl_2.2H_2O$ that is used to adjust the concentration of $Cl^-$ to a comparable level for each samples. Meanwhile, a reference object is made with similar steps by using a recipe of same amount of stucco, water, starch, $CaCl_2.2H_2O$ and accelerator. The cross-cut test is also applied to the reference object.

Figure 4:
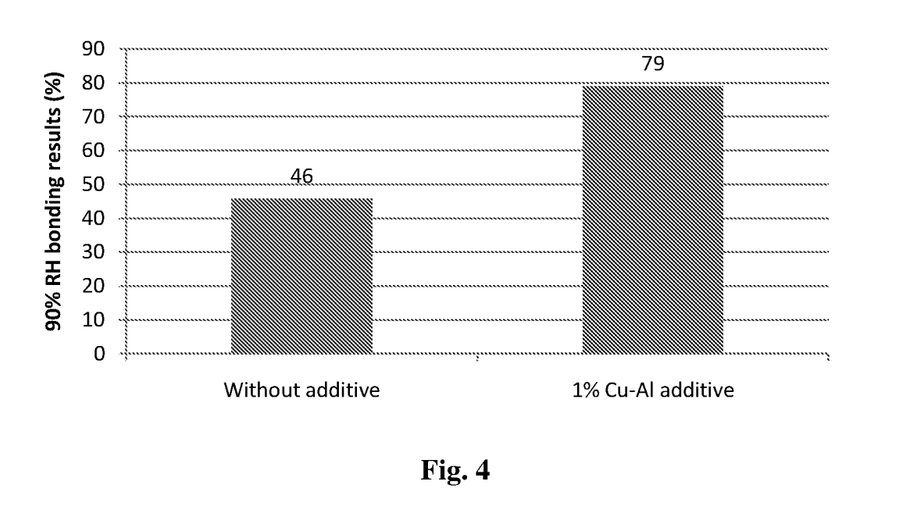
FIG. 4 shows the result of cross-cut test on samples of Example 3.

FIG. 4 and Table 3 show the cross-test result of example 3 and a reference object.

TABLE 3

| | Additive (Wt. %) | Adhesive (wt. %) | 90% RH Bonding test result (%) |
|---|---|---|---|
| Sample 3 | 1 | 0.3 | 79 |
| Reference object 3 | 0 | 0.3 | 46 |

With reference to Table 3 and FIG. 4, it can be concluded that the additive as formula (4) improves the bonding of a final product of gypsum board.

Example 4

In this example, cross-cut tests were applied to several samples of gypsum board made by using a composition comprising stucco, starch, water, and additive as shown in the formula (2).

The samples 4-1 to 4-6 were made with the steps above by using the composition with the following recipes specified in Table 4. Meanwhile, a reference object was similarly made by the steps mentioned above, and particularly, by using the recipe shown in the following Table 4.

TABLE 4

| | Stucco (g) | Water (g) | Additive (g) | Adhesive (g) | accelerator (g) |
|---|---|---|---|---|---|
| Reference object 4 | 700 | 630 | 0 | 2.1 | 0.7 |
| Sample 4-1 | 700 | 630 | 0.35 | 2.1 | 0.7 |
| Sample 4-2 | 700 | 630 | 3.5 | 2.1 | 0.7 |
| Sample 4-3 | 700 | 630 | 7 | 2.1 | 0.7 |
| Sample 4-4 | 700 | 630 | 14 | 2.1 | 0.7 |
| Sample 4-5 | 700 | 630 | 21 | 2.1 | 0.7 |
| Sample 4-6 | 700 | 630 | 35 | 2.1 | 0.7 |

Figure 5:
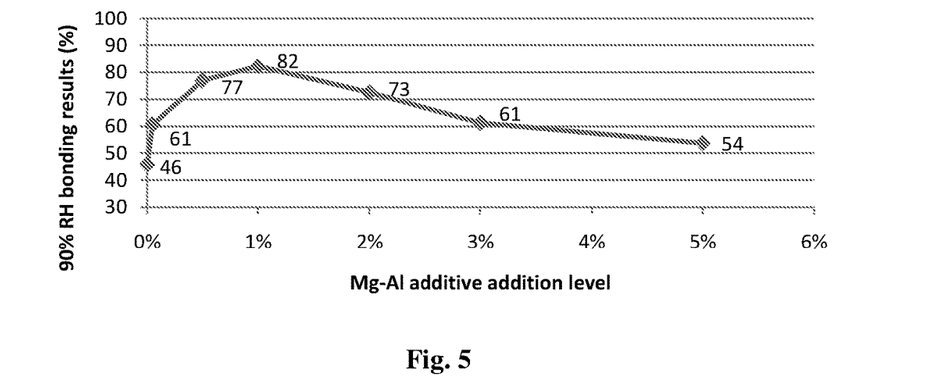
FIG. 5 shows the result of cross-cut test on samples of Example 4.

With reference to FIG. 5 and Table 5, the bonding strength between a gypsum plate and lining paper in a gypsum board increases with an increase in the content level of the additive, up until a peak of 1 wt. % additive. If the additive is increased above 1 wt. % additive, the bonding strength decreases.

TABLE 5

| | Additive (Wt. %) | Adhesive (wt. %) | 90% RH Bonding test result (%) |
|---|---|---|---|
| Reference object 4 | 0 | 0.3 | 46 |
| Sample 4-1 | 0.05 | 0.3 | 61 |
| Sample 4-2 | 0.5 | 0.3 | 77 |
| Sample 4-3 | 1.0 | 0.3 | 82 |
| Sample 4-4 | 2.0 | 0.3 | 73 |
| Sample 4-5 | 3.0 | 0.3 | 61 |
| Sample 4-6 | 5.0 | 0.3 | 54 |

Example 5

In this example, cross-cut test was applied to samples of gypsum board made by using a composition comprising stucco, starch, water, and additive as shown in the formula (2).

The samples 5-1 to 5-9, as shown in Table 7, of this example were made with the steps I-IV mentioned above and by using compositions with the recipes shown in Table 6. Similarly, reference objects 5-1 to 5-3 were made in this example by steps similar to those as described above, with different recipes, as shown in Table 6 respectively.

TABLE 6

| | Stucco (g) | Water (g) | Additive (g) | Adhesive (g) | accelerator (g) |
|---|---|---|---|---|---|
| Reference object 5-1 | 700 | 630 | 0 | 2.1 | 0.7 |
| Sample 5-1 | 700 | 630 | 3.5 | 2.1 | 0.7 |
| Sample 5-2 | 700 | 630 | 7 | 2.1 | 0.7 |
| Sample 5-3 | 700 | 630 | 21 | 2.1 | 0.7 |
| Reference object 5-2 | 700 | 630 | 0 | 4.2 | 0.7 |
| Sample 5-4 | 700 | 630 | 3.5 | 4.2 | 0.7 |
| Sample 5-5 | 700 | 630 | 7 | 4.2 | 0.7 |
| Sample 5-6 | 700 | 630 | 21 | 4.2 | 0.7 |
| Reference object 5-3 | 700 | 630 | 0 | 7 | 0.7 |
| Sample 5-7 | 700 | 630 | 3.5 | 7 | 0.7 |
| Sample 5-8 | 700 | 630 | 7 | 7 | 0.7 |
| Sample 5-9 | 700 | 630 | 21 | 7 | 0.7 |

Figure 6:
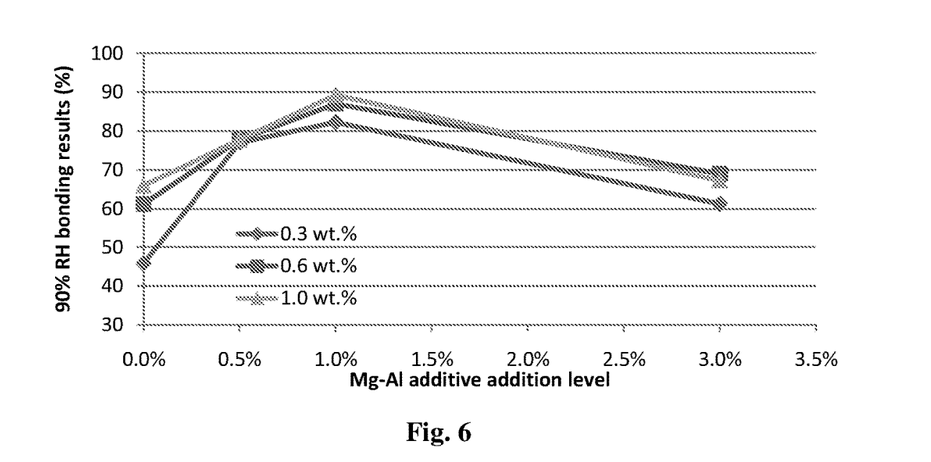
FIG. 6 shows the result of cross-cut test on samples of Example 5.

Table 7 and FIG. 6 show the cross-cut test result of the samples 5-1 to 5-9 and the reference objects 5-1 to 5-3.

TABLE 7

| | Additive (Wt. %) | Adhesive (wt. %) | 90% RH Bonding test result (%) |
|---|---|---|---|
| Reference object 5-1 | 0 | 0.3 | 46 |
| Sample 5-1 | 0.5 | 0.3 | 77 |
| Sample 5-2 | 1.0 | 0.3 | 82 |
| Sample 5-3 | 3.0 | 0.3 | 61 |
| Reference object 5-2 | 0 | 0.6 | 61 |
| Sample 5-4 | 0.5 | 0.6 | 78 |
| Sample 5-5 | 1.0 | 0.6 | 87 |
| Sample 5-6 | 3.0 | 0.6 | 69 |
| Reference object 5-3 | 0 | 1.0 | 66 |
| Sample 5-7 | 0.5 | 1.0 | 78 |
| Sample 5-8 | 1.0 | 1.0 | 89 |
| Sample 5-9 | 3.0 | 1.0 | 69 |

With reference to Table 7 and FIG. 6, especially to sample 5-1 and the reference object 5-3, use of the additive at 0.5 wt. % improves the bonding of the gypsum board to a higher level than adding the starch to 1.0 wt. % of the stucco, which could possibly lower the cost of a gypsum board.

Example 6

In this example, a gypsum board comprises stucco, starch, water and additive as shown in the formula (2), wherein the content of Cl⁻ is 200 ppm, and the content of the additive is 3 wt. % of the stucco.

A set-time test was applied to the gypsum sample of this example, and also to a reference composition, which could be made by mixing stucco, water and accelerator together with a blender via the following steps:
1. Weigh 200 g stucco, 140 g water and 0.7 g accelerator individually;
2. Hand mix stucco and accelerator before pouring into water, and put the water into the container of a blender;
3. Complete pouring the powder mixture into the water within 15 s;
4. Wait for another 15 s;
5. Start mixing for 10 s. After that the gypsum slurry is made.

Similarly, the gypsum sample of this example could be made by the following steps:
1. Weigh 200 g stucco, 140 g water, 6 g additive and 0.7 g accelerator individually;
2. Hand mix stucco, additive and accelerator before pouring into water, and put the water into the container of a blender;
3. Complete pouring the mixture powder into water within 15 s;
4. Wait for another 15 s;
5. Start mixing for 10 s. After that the gypsum slurry is made.

The set-time test could be conducted using the following steps:
1. Start the timer and pour the gypsum slurry into 125 ml paper cup and fill it up;
2. Use scraper to remove the excess slurry and make the surface smooth;
3. Use Vicat needle to penetrate the slurry. Once the needle only can penetrate 20 mm, record the time as the set-time value.

Figure 7:
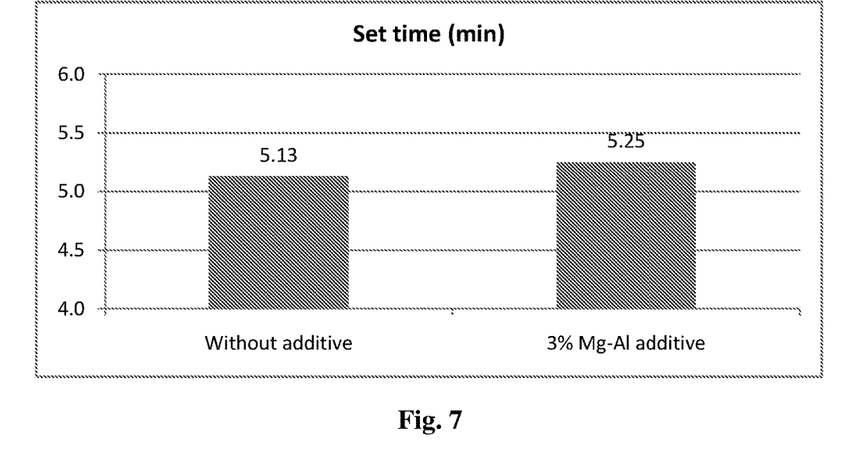
FIG. 7 shows the result of cross-cut test on samples of Example 6.

FIG. 7 and the following Table 8 show the results of the set-time test to the gypsum board of this example and the reference object.

TABLE 8

|  | Additive (Wt. %) | Set Time (Min.) |
| --- | --- | --- |
| Reference object 6 | 0 | 5.13 |
| Sample 6 | 3 | 5.25 |

With reference to Table 8, adding 3 wt. % of the additive of formula (2) would not significantly influence the set-time of a gypsum board, comparing the one made without the additive.

Example 7

In this example, a gypsum paste/slurry is made by using a composition that comprises stucco, water and additive as shown in the formula (2), wherein the content of Cl⁻ is 200 ppm, and the content of the additive is 3 wt. %.

A spread test was applied to the gypsum paste of this example, and also to a reference object. The reference object can be made by mixing stucco, water and accelerator together in a blender via the follow steps.

1. Weigh 200 g stucco, 140 g water and 0.7 g accelerator individually;
2. Hand mix stucco and accelerator before pouring into water, and put the water into the container of a blender;
3. Complete pouring the mixture powder into water within 15 s;
4. Wait for another 15 s.
5. Start mixing for 10 s. After that the gypsum slurry is made.

Similarly, the gypsum paste of this example could be made by the following steps.
1. Weigh 200 g stucco, 140 g water, 6 g additive and 0.7 g accelerator individually;
2. Hand mix stucco, additive and accelerator before pouring into water, and put the water into the container of blender;
3. Complete pouring the mixture powder into water within 15 s;
4. Wait for another 15 s.
5. Start mixing for 10 s. After that the gypsum slurry is made.

The spread test can be conducted as follows.
1. Pour the gypsum slurry into metal ring and fill it up. The metal ring is placed on a metal plate and keep the ring and the plate combine tightly;
2. Use scraper to remove the excess slurry and make the surface smooth;
3. Lift the metal ring with constant speed, and the gypsum slurry will spread to a paste. Measure the diameter of that paste as the spread value.

Figure 8:
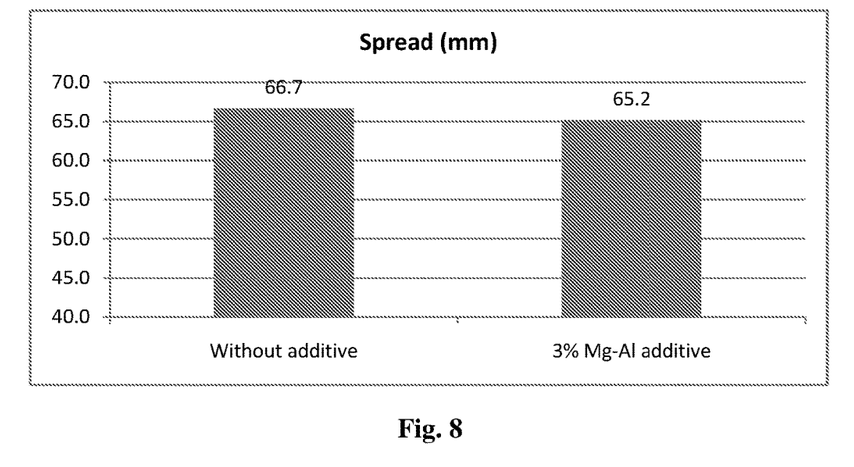
FIG. 8 shows the result of cross-cut test on samples of Example 7.

Table 9 and FIG. 8 show the result of spread tests for the gypsum board and the reference object of this example.

TABLE 9

|  | Additive (Wt. %) | Spread (mm) |
| --- | --- | --- |
| Reference object 7 | 0 | 66.7 |
| Sample 7 | 3 | 65.2 |

With reference to Table 9, adding 3 wt. % of the additive does not significantly negatively impact the spread of the gypsum board.

Example 8

In this example, a gypsum board composition comprises stucco, PVA, water and addition as shown in the formula (2).

Samples of gypsum board and the reference object could be made with the recipes in Table 10.

TABLE 10

|  | Stucco (g) | Water (g) | Additive (g) | PVA (g) | accelerator (g) |
| --- | --- | --- | --- | --- | --- |
| Reference object 8 | 700 | 630 | 0 | 0 | 0.7 |
| Sample 8-1 | 700 | 630 | 0 | 3.5 | 0.7 |
| Sample 8-2 | 700 | 630 | 7 | 0 | 0.7 |
| Sample 8-3 | 700 | 630 | 7 | 3.5 | 0.7 |

Figure 9:
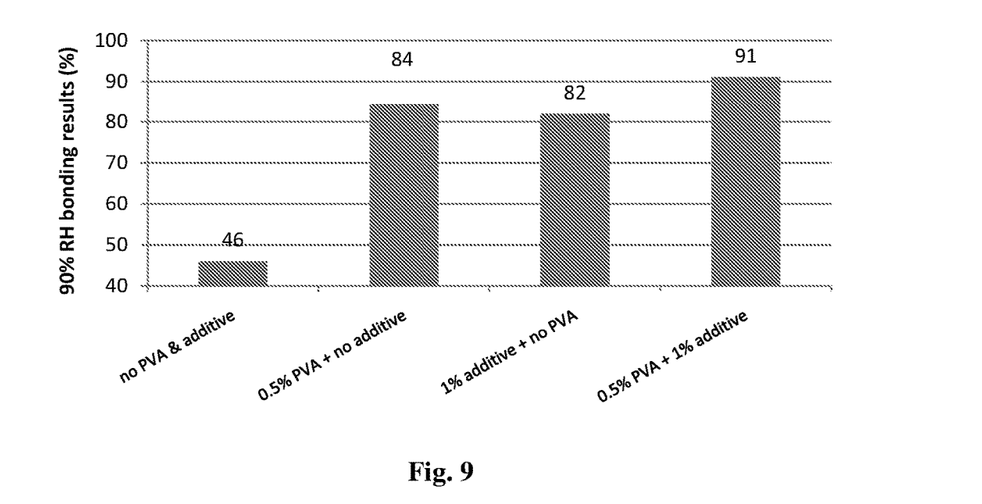
FIG. 9 shows the result of cross-cut test on samples of Example 8.

With reference to Table 11 and FIG. 9, the additive can both improve the bonding of a gypsum board with PVA as adhesive.

TABLE 11

| | Additive (Wt. %) | PVA (Wt. %) | 90% RH Bonding test result (%) |
|---|---|---|---|
| Reference object 8 | 0.0 | 0.0 | 46 |
| Sample 8-1 | 0.0 | 0.5 | 84 |
| Sample 8-2 | 1.0 | 0.0 | 82 |
| Sample 8-3 | 1.0 | 0.5 | 91 |

Example 9

In this example, cross-cut tests were applied to several samples of gypsum board made by using a composition comprising stucco, PVA, water, and additive as shown in the formula (2).

The samples 12-1 to 12-6 were made with the steps I-IV above by using the compositions with the following recipes in Table 12. Similarly, a reference object can be made by the steps I-IV mentioned above, and particularly, by using the recipe shown in the following Table 12.

TABLE 12

| | Stucco (g) | Water (g) | Additive (g) | PVA (g) | accelerator (g) |
|---|---|---|---|---|---|
| Reference object 9 | 700 | 630 | 0 | 2.1 | 0.7 |
| Sample 9-1 | 700 | 630 | 0.35 | 2.1 | 0.7 |
| Sample 9-2 | 700 | 630 | 0.7 | 2.1 | 0.7 |
| Sample 9-3 | 700 | 630 | 3.5 | 2.1 | 0.7 |
| Sample 9-4 | 700 | 630 | 5.6 | 2.1 | 0.7 |
| Sample 9-5 | 700 | 630 | 7 | 2.1 | 0.7 |
| Sample 9-6 | 700 | 630 | 14 | 2.1 | 0.7 |

Figure 10:
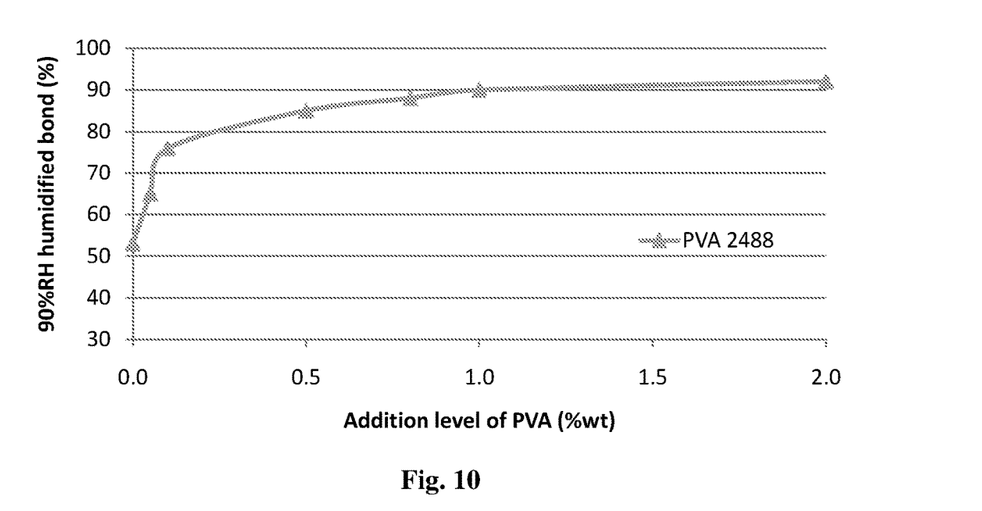
FIG. 10 shows the result of cross-cut test on samples of Example 9.

With reference to FIG. 10 and Table 13, bonding of a gypsum board can increase with an increase in the content level of the additive.

TABLE 13

| | Additive (Wt. %) | PVA (wt. %) | 90% RH Bonding test result (%) |
|---|---|---|---|
| Reference object 9 | 0 | 0.3 | 53 |
| Sample 9-1 | 0.05 | 0.3 | 65 |
| Sample 9-2 | 0.1 | 0.3 | 76 |
| Sample 9-3 | 0.5 | 0.3 | 85 |
| Sample 9-4 | 0.8 | 0.3 | 88 |
| Sample 9-5 | 1.0 | 0.3 | 90 |
| Sample 9-6 | 2.0 | 0.3 | 92 |

Example 10

In this example, the cross-cut test was applied to a gypsum board made by using a composition comprising stucco, starch, water, and additive as shown in the formula (2), wherein the content of additive is 1 wt. %, the content of starch is 0.3 wt. % of the stucco, and the level of Cl— in the composition are 200 ppm and 1200 ppm respectively.

A gypsum board of this example and two reference objects could be made by the steps I-IV mentioned above with the following recipes respectively.

TABLE 14

| | Stucco (g) | Water (g) | Additive (g) | Adhesive (g) | accelerator (g) | Cl$^-$ (ppm) |
|---|---|---|---|---|---|---|
| Reference object 10-1 | 700 | 630 | 0 | 2.1 | 0.7 | 200 |
| Reference object 10-2 | 700 | 630 | 0 | 2.1 | 0.7 | 1200 |
| Sample 10-1 | 700 | 630 | 7 | 2.1 | 0.7 | 1200 |

Meanwhile, two reference objects are also made for this example, which could be made by the steps I-IV as described above, and particularly using starch in amount of 0.3 wt. % of the stucco. The two reference objects differ in that they are made by using a composition with content of Cl— at 200 ppm and 1200 ppm respectively.

Figure 11:
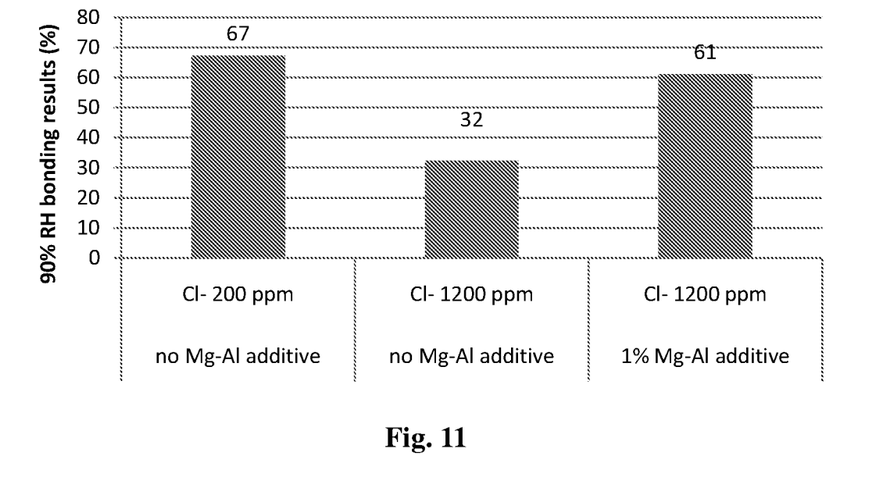
FIG. 11 shows the result of cross-cut test on samples of Example 10.

Table 15 and FIG. 11 show the result of cross-cut tests for the gypsum board of this example and the two reference objects.

TABLE 15

| | Additive (Wt. %) | Starch (wt. %) | Cl$^-$ (ppm) | 90% RH Bonding Test (%) |
|---|---|---|---|---|
| Reference object10-1 | 0.0 | 0.3 | 200 | 67 |
| Reference object10-2 | 0.0 | 0.3 | 1200 | 32 |
| Sample 10-1 | 1.0 | 0.3 | 1200 | 61 |

With reference to Table 13 and FIG. 11, the additive improves the bonding by mitigating the negative impact of Cl—, when the content level of Cl— increases.

Example 11

The additive can still work to improve the bonding of the final product when the starch is at a high level.

In this example, a gypsum board was made by the steps I-IV mentioned above and using a composition comprising stucco, starch, water, and additive as shown in the formula (2), wherein the content of additive is 1 wt. %, the content of starch is 5 wt. % of the stucco, and the level of Cl$^-$ in the composition is 1200 ppm. The reference object is made similarly but without the additive.

The recipes of the Reference object 11 and Sample 11 are shown in the Table 16 as follows.

TABLE 16

| | Stucco (g) | Water (g) | Additive (g) | Adhesive (g) | accelerator (g) | Cl$^-$ (ppm) |
|---|---|---|---|---|---|---|
| Reference object 11 | 700 | 630 | 0 | 35 | 0.7 | 1200 |
| Sample 11 | 700 | 630 | 7 | 35 | 0.7 | 1200 |

Figure 12:
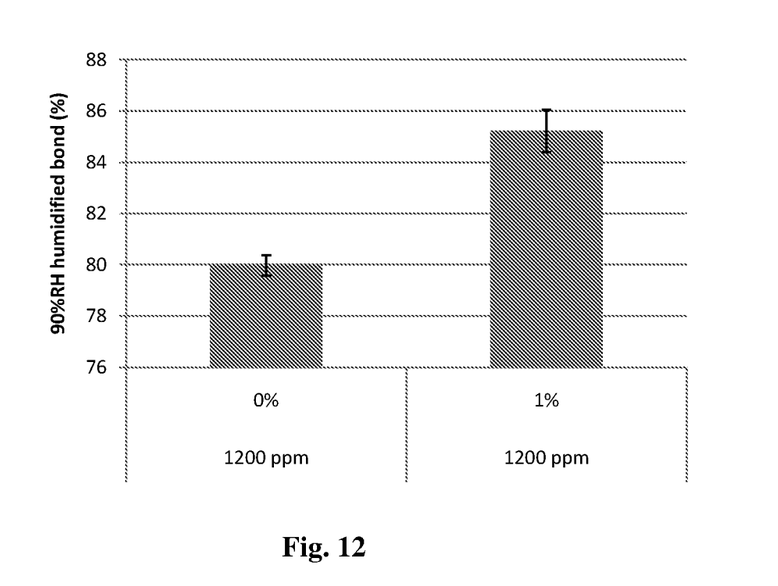
FIG. 12 shows the result of cross-cut test on samples of Example 11.

The cross-cut tests would be applied to the Reference object 11 and the Sample 11. Table 17 and FIG. 12 show the result of the test.

TABLE 17

| | Additive (Wt. %) | Starch (wt. %) | Cl⁻ (ppm) | 90% RH Bonding Test (%) |
|---|---|---|---|---|
| Reference object 11 | 0.0 | 5 | 1200 | 79 |
| Sample 11 | 1.0 | 5 | 1200 | 85 |

Obviously, the additive can still work to improve the bonding of the final product, even though the content of the starch is very high.

What is claimed is:

1. A gypsum board composition, comprising:
stucco, adhesive, water and additive for improving bonding,
wherein the additive for improving bonding is shown in chemical formula (1):

$$M^I M^{II}(OH)_2(A^{n-}) \cdot mH_2O \quad (1)$$

wherein $M^I$ is a divalent metal ion, $M^{II}$ is a trivalent metal ion, and $A^{n-}$ is an interlayer anion, and wherein $M^I$ and $M^{II}$ are different metals.

2. The composition according to claim 1, wherein $M^I$ is selected from a group consisting of $Mg^{2+}$, $Ni^{2+}$, $Fe^{2+}$, $Ca^{2+}$, $Zn^{2+}$, $Cu^{2+}$, and $Mn^{2+}$, wherein $M^{II}$ is selected from a group consisting of $Fe^{2+}$, $Al^{2+}$, $Ni^{2+}$, and $Co^{2+}$, and wherein $A^{2-}$ is selected from a group consisting of $CO_3^{2+}$, $OH^-$, $NO_3^-$, $PO_3^{4-}$, and $SO_4^{2-}$.

3. The composition according to claim 1, wherein $M^I$ is $Mg^{2+}$, $M^{II}$ is $Al^{2+}$, and $A^{n-}$ is $CO_2^{2-}$.

4. The composition according to claim 1, wherein the content of the additive for improving bonding is less than or equal to 5 wt. % and greater than 0 wt. % of the stucco.

5. The composition according to claim 1, wherein the adhesive is starch and/or Polyvinyl Alcohol, wherein the content of the adhesive is greater than 0.06 wt. % of the stucco.

6. The composition according to claim 1, wherein the content of the additive for improving bonding is less than or equal to 5 wt. % and greater than 0 wt. % of the stucco, and the content of the adhesive is greater than 0.06 wt. % of the stucco.

7. A gypsum board, comprising:
a main gypsum plate comprising stucco, adhesive, and additive therein,
lining paper on both major surfaces of the main gypsum plate;
wherein the additive is shown in chemical formula (1):

$$M^I M^{II}(OH)_2(A^{n-}) \cdot mH_2O \quad (1)$$

wherein $M^I$ is a divalent metal ion, $M^{II}$ is a trivalent metal ion, and $A^{n-}$ is an interlayer anion comprising at least Cl⁻, and wherein $M^I$ and $M^{II}$ are different metals.

8. The gypsum board according to claim 7, wherein $M^I$ is selected from a group consisting of $Mg^{2+}$, $Ni^{2+}$, $Fe^{2+}$, $Ca^{2+}$, $Zn^{2+}$, $Cu^{2+}$, and $Mn^{2+}$, wherein $M^{II}$ is selected from a group consisting of $Fe^{2+}$, $Al^{2+}$, $Ni^{2+}$, and $Co^{2+}$, and wherein $A^{n-}$ additionally comprises an anion from a group consisting of $CO_3^{2-}$, $OH^-$, $NO_3^-$, $PO_3^{4-}$, and $SO_4^{2-}$.

9. The gypsum board according to claim 7, wherein $M^I$ is $Mg^{2+}$, and $M^{II}$ is $Al^{2+}$.

10. The gypsum board according to claim 7, wherein the content of the additive is less than or equal to 5 wt. % and greater than 0 wt. % of the stucco.

11. The gypsum board according to claim 7, wherein the content of the adhesive is greater than 0.06 wt. % of the stucco.

12. A method for using a compound shown in chemical formula (1):

$$M^I M^{II}(OH)_2(A^{n-}) \cdot mH_2O \quad (1)$$

wherein $M^I$ is a divalent metal ion, $M^{II}$ is a trivalent metal ion, and $A^{n-}$ is an interlayer anion, wherein $M^I$ and $M^{II}$ are different metals, and wherein the compound is used as additive for improving bonding in a gypsum board.

13. The method according to claim 12, wherein $M^I$ is selected from a group consisting of $Mg^{2+}$, $Ni^{2+}$, $Fe^{2+}$, $Ca^{2+}$, $Zn^{2+}$, $Cu^{2+}$, and $Mn^{2+}$, wherein $M^{II}$ is selected from a group consisting of $Fe^{2+}$, $Al^{1+}$, $Cr^{2+}$, and $Cu^{2+}$, wherein $A^{n-}$ is selected from a group consisting of $CO_3^{2-}$, $OH^-$, $NO_3^-$, $PO_3^{2-}$, and $SO_4^{2-}$.

14. The method according to claim 12, wherein $M^I$ is $Mg^{2+}$, $M^{II}$ is $Al^{3+}$, and $A^{n-}$ is $CO_3^{2-}$.

15. The method according to claim 12, wherein the gypsum board comprises stucco and the content of the compound is less than or equal to 5 wt. % and greater than 0 wt. % of the stucco.

16. The method according to claim 12, wherein the gypsum board comprises stucco and adhesive.

17. The method according to claim 16, wherein the adhesive is starch and/or Polyvinyl Alcohol and the content of the adhesive is 0.3 wt. % of the stucco.

18. The method according to claim 16, wherein the content of the compound is less than or equal to 5 wt. % and greater than 0 wt. % of the stucco, and the content of the adhesive is greater than 0.06 wt. % of the stucco.

19. A gypsum plaster composition, comprising stucco, water, and an additive of the following chemical formula, $$M^I M^{II}(OH)_2(A^{n-}) \cdot mH_2O, \quad (1),$$

wherein $M^I$ is a divalent metal ion, $M^{II}$ is a trivalent metal ion, and $A^{n-}$ is an interlayer anion, and wherein $M^I$ and $M^{II}$ are different metals.

20. The gypsum plaster composition according to claim 19, wherein $M^I$ is selected from a group consisting of $Mg^{2+}$, $Ni^{2+}$, $Fe^{2+}$, $Ca^{2+}$, $Zn^{2+}$, $Cu^{2+}$, and $Mn^{2+}$, wherein, $M^{II}$ is selected from a group consisting of $Fe^{2+}$, $Al^{2+}$, $Ni^{3+}$, and $Co^{3+}$, wherein $A^{n-}$ is selected from a group consisting of $CO_3^{2-}$, $OH^-$, $NO_3^-$, $PO_3^{4-}$, and $SO_4^{2-}$.

21. The composition according to claim 19, wherein $M^I$ is $Mg^{2+}$, $M^{II}$ is $Al^{2+}$, and $A^{n-}$ is $CO_3^{2-}$.

22. The composition of claim 19, wherein the composition further comprises perlite, wherein the perlite is present in an amount of 1-10% relative to the weight of the gypsum particles.

23. The gypsum plaster composition of claim 19, wherein the content of the additive is less than or equal to 5 wt. % and greater than 0 wt. % of the stucco.

24. A gypsum-based jointing compound composition, comprising:
stucco, water, polymer additives and an additive of the following chemical formula (1):

$$M^I M^{II}(OH)_2(A^{n-}) \cdot mH_2O \quad (1)$$

wherein $M^I$ is a divalent metal ion, $M^{II}$ is a trivalent metal ion, and $A^{n-}$ is an interlayer anion, and wherein $M^I$ and $M^{II}$ are different metals.

25. The gypsum-based jointing compound composition of claim 24, wherein $M^I$ is selected from a group consisting of $Mg^{2+}$, $Ni^{2+}$, $Fe^{2+}$, $Ca^{2+}$, $Zn^{2+}$, $Cu^{2+}$, and $Mn^{2+}$, wherein $M^{II}$ is selected from a group consisting of $Fe^{2+}$, $Al^{2+}$, $Ni^{2+}$, and $Co^{2+}$, and wherein $A^{n-}$ is selected from a group consisting of $CO_3^{2-}$, $OH^-$, $NO_3^-$, $PO_3^{4-}$, and $SO_4^{1-}$.

26. The gypsum-based jointing compound composition of claim 24, wherein $M^I$ is $Mg^{2+}$, $M^{II}$ is $Al^{2+}$, and $A^{n-}$ is $CO_3^{2-}$.

27. The gypsum-based jointing compound composition of claim 24, wherein the content of the additive is less than or equal to 5 wt. % and greater than 0 wt. % of the stucco.

28. The composition according to claim 5, wherein the content of the adhesive is from 0.3 wt. % to 1.0 wt. % of the stucco.

29. The composition according to claim 5, wherein the content of the adhesive is from 0.3 wt. % to 0.5 wt. % of the stucco.

30. The composition according to claim 5, wherein the content of the adhesive is 0.3 wt. % of the stucco.

31. The composition according to claim 6, wherein the content of the adhesive is from 0.3 wt. % to 1.0 wt. % of the stucco.

32. The composition according to claim 6, wherein the content of the adhesive is from 0.3 wt. % to 0.5 wt. % of the stucco.

33. The composition according to claim 6, wherein the content of the adhesive is 0.3 wt. % of the stucco.

* * * * *

UNITED STATES PATENT AND TRADEMARK OFFICE
CERTIFICATE OF CORRECTION

PATENT NO. : 10,399,904 B2  
APPLICATION NO. : 16/062532  
DATED : September 3, 2019  
INVENTOR(S) : Kane Ironside and Hao Song Page 1 of 1

It is certified that error appears in the above-identified patent and that said Letters Patent is hereby corrected as shown below:

In the Claims

Column 13, Line 30:

" $CO_2^{2-}$ " should be deleted and -- $CO_3^{2-}$ -- should be inserted therefor.

Signed and Sealed this  
Thirty-first Day of December, 2019

Andrei Iancu  
*Director of the United States Patent and Trademark Office*